Figure 1:
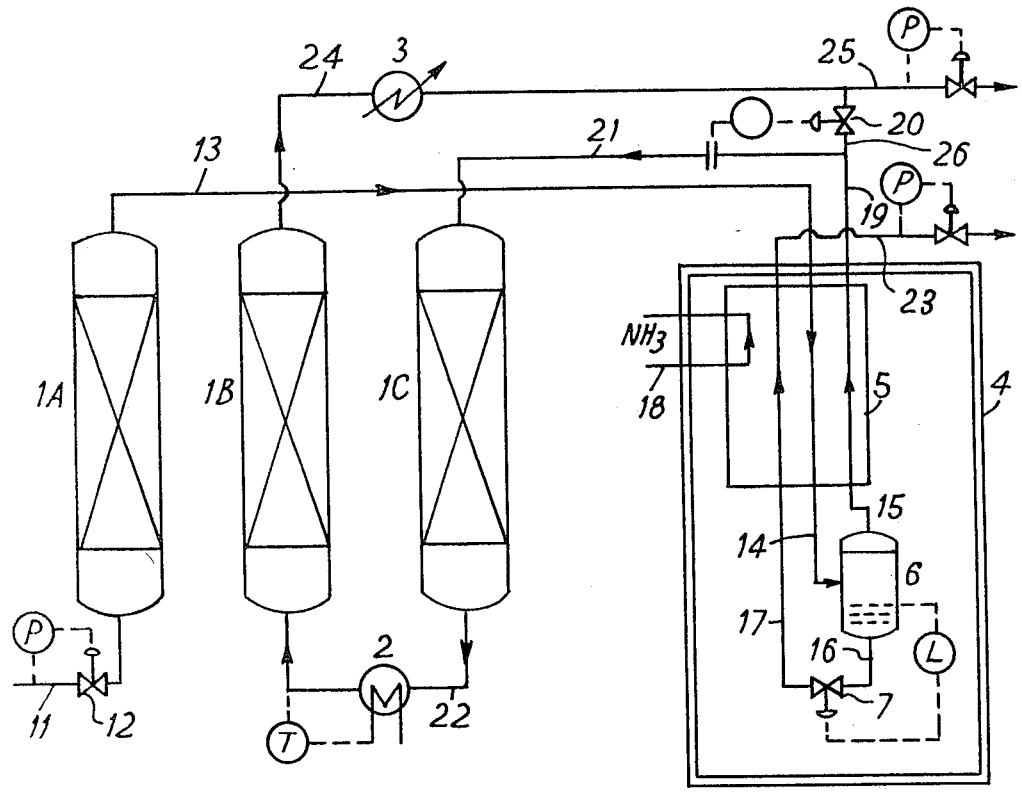

United States Patent [19]

Isalski

[11] 4,266,957
[45] May 12, 1981

[54] RECOVERY OF HYDROGEN AND AMMONIA FROM PURGE GAS

[75] Inventor: Wieslaw H. Isalski, Sale, England

[73] Assignee: Petrocarbon Development Limited, Manchester, England

[21] Appl. No.: 65,963

[22] Filed: Aug. 13, 1979

[30] Foreign Application Priority Data

Jun. 7, 1979 [GB] United Kingdom ............... 19927/79

[51] Int. Cl.³ ................................................. F25J 1/00
[52] U.S. Cl. ............................................ 62/18; 62/23; 62/40; 252/374
[58] Field of Search ............................. 62/18, 23–28, 62/40; 252/374

[56] References Cited

U.S. PATENT DOCUMENTS

| 3,257,812 | 6/1966 | Shaievitz | 62/18 |
| 3,324,669 | 6/1967 | Cooper et al. | 62/18 |
| 3,377,812 | 4/1968 | Garrett et al. | 62/18 |
| 3,628,340 | 12/1971 | Meisler et al. | 62/18 |
| 3,780,534 | 12/1973 | Lofredo et al. | 62/18 |

Primary Examiner—Norman Yudkoff
Attorney, Agent, or Firm—Browdy and Neimark

[57] ABSTRACT

Ammonia and hydrogen values are recovered from the purge gas from an ammonia synthesis recycle stream by removing the ammonia from the purge gas by adsorption in an ammonia adsorber, thereafter separating the hydrogen by cryogenic partial condensation, the refrigeration for which is provided by expanding and evaporating the condensate, and recovering the ammonia from the adsorber by heating a part of the hydrogen and using it as the regenerating gas for the adsorber, the heat for heating the hydrogen preferably being provided by combusting a part of the evaporated condensate recovered from the cryogenic partial condensation.

15 Claims, 2 Drawing Figures

RECOVERY OF HYDROGEN AND AMMONIA FROM PURGE GAS

This invention relates to the recovery of ammonia and hydrogen values from the purge gas withdrawn from the recycle gas of an ammonia synthesis reactor and is particularly concerned with providing a simple and elegant method and apparatus especially intended for use with small synthesis plants; that is, plants which produce about 600 tons per day or less of ammonia.

In the synthesis of ammonia from nitrogen and hydrogen, the reaction is incomplete and it is well known that where the unreacted gases are recycled to the ammonia synthesis reactor it is necessary to remove a purge gas from the recycling gas stream in order to prevent the undesirable build-up in the reactor of contaminants, principally methane and argon, which are generally associated with synthesis gases.

This purge gas generally contains valuable hydrogen and it is well known to treat the gas to recover the hydrogen, usually cryogenically by partially condensing the gas at sub-ambient temperatures to condense out the contaminants. Gas streams containing 90% or more hydrogen can be recovered in this manner.

The purge gas also generally contains a small amount (e.g. 1.5–2%) of ammonia. When the hydrogen is to be recovered from this gas in a cryogenic unit, the ammonia has to be removed, as it would otherwise freeze and block the equipment. It is customary to recover this ammonia as an aqueous solution by scrubbing the purge gas with water and subsequently converting it to anhydrous ammonia in a distillation column. The ammonia-free purge gas is then dried by adsorption of water vapour on molecular sieves or some other suitable adsorbent. Alternatively, the ammonia may be separated from the purge gas by refrigeration. Both these methods are cumbersome and expensive, though acceptable in the case of large units associated with synthesis plants producing 1000 tons per day or more of ammonia.

There are however many smaller ammonia plants of capacities around 600 tons per day or less, and the recovery of hydrogen from the purge gases of these plants is often desirable. This invention provides a simple, elegant and cheap method of recovering the ammonia contained in these gases in association with a simple and inexpensive cryogenic unit for hydrogen recovery. No machinery is necessary for the process and the entire equipment, including the cryogenic unit, can be mounted on two skids.

In essence, the process involves removing the ammonia from the purge gas by adsorption and providing the regenerating gas for the ammonia adsorber from the hydrogen gas stream obtained from the partial condensation of the substantially ammonia-free purge gas obtained from the adsorption step.

According to the present invention, there is provided a method of treating the purge gas from an ammonia synthesis recycle stream to recover from said purge gas ammonia and hydrogen values for recycle to the ammonia synthesis reaction, the method comprising providing the purge gas at superatmospheric pressure, removing ammonia from the compressed purge gas by adsorption in an ammonia adsorber, cooling substantially ammonia-free compressed purge gas recovered from the adsorption step to sub-ambient temperature to partially condense it and recovering therefrom a hydrogen rich gas stream and a condensate stream both at superatmospheric pressure, providing refrigeration for the partial condensation by expanding the condensate and thereafter evaporating it in indirect heat exchange relationship with the purge gas to be cooled, and recovering ammonia from the ammonia adsorber by passing therethrough at elevated temperature a regenerating gas at superatmospheric pressure, which gas is provided from the hydrogen rich gas stream.

By employing a part of the hydrogen rich gas stream as the regenerating stream for the ammonia adsorber, the ammonia values in the purge gas are conveniently recovered with the hydrogen for return to the ammonia synthesis reactor. Moreover, regeneration with this hydrogen gas stream can be conducted at a lower temperature than when the regeneration stream is derived from the evaporated condensate, as has been the general practice hitherto, and this drop in temperature is sufficient to make it practicable to employ superheated steam to heat the regeneration stream rather than electrical heating as hitherto employed.

As the condensate obtained from the partial condensation will also contain hydrogen, and generally also methane, it will be suitable for use as a fuel gas and therefore, conveniently, the heat for heating that portion of the hydrogen rich gas stream which is to form the regenerating gas may be provided by combustion of a fuel gas stream provided from the evaporated condensate. For example, where the regenerating gas is heated by superheated steam, the latter may be generated using heat provided by combustion of such a fuel gas stream.

After the adsorber is regenerated, it is necessary to cool it ready for re-use in adsorption mode and in a preferred embodiment of the invention this is effected by passing through it a cooling gas provided from the hydrogen rich gas stream. Preferably at least three ammonia adsorber zones are employed and are arranged such that while at least one is in adsorption mode, at least a second is being regenerated and at least a third is being cooled subsequent to regeneration. Advantageously, the regeneration gas for the second adsorber zone is provided by heating cooling gas recovered from the third adsorber zone.

The regenerating gas recovered from the second adsorber zone, and containing ammonia recovered from the adsorber zone, is preferably cooled and combined with the remainder of the hydrogen rich gas stream for return to the ammonia synthesis reactor.

Where the pressure drop to which the condensate may be subjected is limited because of the desire to recover the evaporated condensate at a superatmospheric pressure high enough for it to be employed as a fuel without further compression, e.g. a pressure of about 5 bar abs or higher, while still recovering a hydrogen rich gas stream of acceptable purity, it has been found desirable except where the purge gas contains relatively large amounts of methane and argon to supplement the refrigeration provided by expansion of the condensate. This is advantageously achieved by means of a refrigerated liquid ammonia stream. This may conveniently be provided by expanding a portion of the liquid ammonia formed in the ammonia synthesis. Alternatively, however, it may be provided from the compressed purge gas stream itself by cooling this stream to condense a part of the ammonia content thereof prior to removing the balance by adsorption, and recovering and expanding the condensate. This alternative is suitable where the purge gas contains more than about 2% ammonia because the process of the invention is particularly suited to purge gas streams containing not more than about 2% ammonia. It also avoids the complication of further pipelining from the ammonia synthesis reactor.

Apparatus suitable for use in the invention comprises an ammonia adsorber unit having an inlet for purge gas to be treated and an outlet for treated purge gas and including at least three adsorption zones and said unit being constructed and arranged for cyclic operation such that in successive periods each zone is (a) connected between said inlet and said outlet and is in adsorption mode, (b) thereafter undergoes regeneration and then (c) is cooled ready for re-use in adsorption mode, and in each period at least one zone is connected between said inlet and outlet and is in adsorption mode, at least a second is undergoing regeneration and at least a third is undergoing cooling ready for re-use in adsorption mode; means for passing cooling gas through said at least third zone to cool it; means for providing heated regeneration gas to said at least second zone; and means for recovering regeneration gas from said at least second zone;

a cryogenic separation unit including a heat exchanger, an expansion valve and a vapour-liquid separator, said heat exchanger having a first passageway having an inlet adapted to be connected for flow of fluid thereto from the outlet for the treated purge gas from said adsorption unit and an outlet connected for flow of fluid therefrom to the inlet of said separator, a second passageway having an inlet connected for flow of fluid thereto from the vapour outlet of said separator and an outlet, and a third passageway having an inlet for flow of fluid thereto from the low pressure outlet of said expansion valve the inlet of which is connected for flow of fluid thereto from the liquid outlet of the separator, and an outlet;

and in which the outlet of said second heat exchanger passageway is connected (a) to said means for providing heated regeneration gas whereby a first portion of the vapour recovered from said vapor/liquid separator is passed to said second zone as regeneration gas and (b) to a product gas pipeline.

Preferably, the means for providing heated regeneration gas to said at least second zone comprises means for heating cooling gas recovered from said at least third zone and providing the heated gas as regeneration gas to said at least second zone, and the outlet of said second heat exchanger passageway is connected for fluid flow to the inlet to said at least third zone whereby said first portion of vapour recovered from said vapour/liquid separator is passed first to said third zone as said cooling gas and thence to said second zone as said regeneration gas.

Suitably, a second conduit is provided for passing the gas recovered from said at least second zone to the product gas pipeline whereby all the hydrogen and ammonia recovered from the purge gas may be contained in a single stream for return to the ammonia synthesis reactor.

Figure 2:
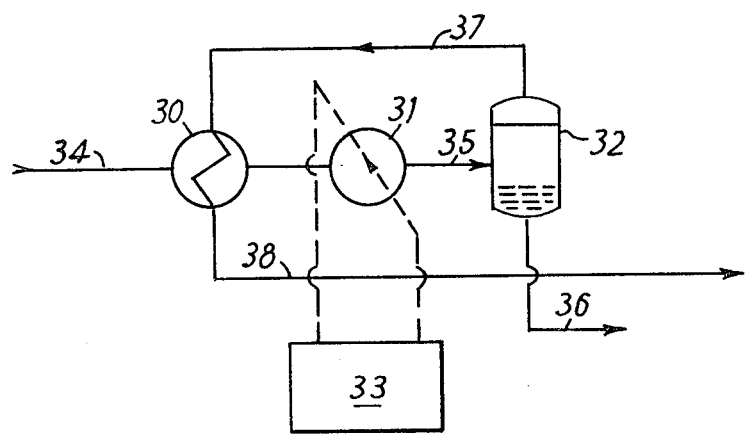

The invention is now illustrated with reference to two embodiments thereof and with the aid of the accompanying drawings in which FIG. 1 is a simplified flow diagram of the combined adsorber and cryogenic separator, and FIG. 2 illustrates an alternative supply of refrigerated liquid ammonia to the cryogenic separator.

Referring to FIG. 1, the apparatus comprises an ammonia adsorber 1 comprising three adsorbent zones 1A, 1B and 1C, a steam heater 2, a cooler 3 and a cold box 4 containing a cryogenic heat exchanger 5, a liquid/vapour separator 6 and an expansion valve 7.

In the arrangement illustrated, adsorption zone 1A is in adsorption mode (i.e. is arranged for passage of purge gas therethrough for removal of ammonia therefrom by adsorption), adsorption zone 1B is being heated and regenerated, and adsorption zone 1C is being cooled ready for re-use in adsorption mode. However, pipes and valves (not illustrated) are provided such that periodically the adsorption zone in adsorption mode is switched to regeneration mode, the adsorption zone being regenerated is cooled and the adsorption zone being cooled is switched to adsorption mode. Thus, in a cycle of three successive periods, each adsorption zone is (1) in adsorption mode, (2) undergoing regeneration, and (3) undergoing cooling ready for re-use in adsorption mode. Automatic means are provided for switching.

Purge gas enters the plant through pipeline 11 at ammonia synthesis pressure which will generally be about 140 to 150 bar. The pressure is reduced in pressure control valve 12, the reduced pressure generally being not less than 50 bar and being suitably in the range of 60 to 80 bar. The primary factors determining the pressure to which the purge gas is reduced are the level of inerts tolerable in the hydrogen rich gas stream to be recovered from the cryogenic separator, (higher levels of purity requiring higher initial purge gas pressures, all other things being equal) and the pressure at which the hydrogen-rich gas stream has to be returned to the synthesis gas compressor for the ammonia synthesis reaction.

The ammonia adsorber may employ any suitable adsorbent in the adsorbent zones, e.g. activated carbon or, preferably, molecular sieves. The purge gas is recovered from the ammonia adsorber in line 13 by which it is passed to the cryogenic separator in cold box 4. In cold box 4, the purge gas is first passed through heat exchanger 5 where it is cooled, generally to below 90° K. and preferably from 86° to 89° K., the choice of temperature depending on the level of inerts acceptable in the hydrogen rich gas stream obtained by separation of the partial condensate formed on cooling the purge gas, all other things being equal.

The cooled and partially condensed purge gas is recovered from the heat exchanger in pipeline 14 and passed to liquid/vapour separator 6. Hydrogen rich gas is recovered from the separator 6 in line 15 and passed back through heat exchanger 5 in indirect counter-current heat exchange relationship with the incoming purge gas.

Condensate is recovered from the vapour/liquid separator 6 in pipeline 16, expanded in level-controlled expansion valve 7 and passed back through heat exchanger 5 in pipeline 17 where it is evaporated by counter-current heat exchange relationship with the purge gas, thereby cooling and partially condensing the purge gas.

The condensate may be expanded to about atmospheric pressure in expansion valve 7 but where it is desired to employ the evaporated condensate recovered from the heat exchanger as a fuel gas, it is advantageous to recover it at a superatmospheric pressure of at least 3 bar and preferably 5 to 7 bar. In this case, as indicated above, it will usually be desirable to provide a supplementary refrigerant stream to the heat exchanger. In the embodiment illustrated, this comprises a refrigerated liquid ammonia stream in line 18. Suitably, this may be provided by expanding a portion of the liquid ammonia formed in the ammonia synthesis reactor.

In an alternative embodiment, which is particularly suitable for use where the purge gas contains more than about 2% ammonia, this refrigerated liquid ammonia stream may be provided from the purge gas itself. A suitable arrangement is illustrated in FIG. 2 where 30 is a heat exchanger, 31 is a refrigerant evaporator, 32 is a liquid/vapour separator and 33 is a refrigeration unit. In this embodiment, prior to being supplied to the adsorber unit the purge gas is passed via pipeline 34 to heat exchanger 30 and thence to refrigerant evaporator 31 and is thereby cooled to condense a part of its ammonia content. The resultant stream is recovered in pipeline 35 and passed to liquid/vapour separator 32 from which the condensate is recovered through pipeline 36 and passed to pipeline 18. The gas, containing the remainder of the ammonia, is recovered from the liquid/vapour separator in pipeline 37, cools the incoming purge gas in heat exchanger 30 and is recovered in pipeline 38 whence it is recycled to pipeline 11. Refrigeration is provided by refrigerator 33. For this embodiment, the purge gas should be cooled to at least $-30°$ C. and preferably to from $-32°$ to $-37°$ C. The refrigeration unit will be chosen accordingly.

The hydrogen rich gas recovered in pipeline 19 from heat exchanger 5 is divided into two portions, the relative sizes of which are controlled by flow-controlled valve 20. The first portion is passed via pipeline 21 to provide the cooling gas for adsorption zone 1C. It is then recovered in pipeline 22, passed through steam heater 2 and then supplied to adsorption zone 1B as the regenerating gas therefor. In heater 2, the gas is suitably heated to at least 200° C. and preferably from 240° to 250° C. Although higher temperatures may be used, little or no advantage is achieved thereby. Suitably, the heat for generating the superheated steam is provided by combustion of a fuel gas provided from the evaporated condensate recovered from the heat exchanger in pipeline 23.

The regeneration gas exiting from adsorber zone 1B will contain ammonia desorbed from the adsorbent in said adsorber zone and is recovered in pipeline 24. It is then cooled in cooler 3 and combined in pipeline 25 with the remainder of the hydrogen rich gas which is supplied to pipeline 25 via pipeline 26 and flow-controlled valve 20. The combined gas stream in pipeline 25 which stream contains the hydrogen and ammonia values recovered from the purge gas, may then suitably be returned to the ammonia synthesis reactor.

The invention is illustrated by the following Example.

EXAMPLE

Using the apparatus and arrangement illustrated in FIG. 1, 4500 Nm³ of purge gas were treated at 71 bar pressure. 3145 Nm³ per hour were withdrawn as hydrogen rich product through line 25 at 70 bar. 1355 Nm³ per hour of fuel gas are withdrawn through line 23 at 3 bar. The compositions are as follows:

|  | Feed Gas M % | Hydrogen-rich Product M % | Fuel Gas M % |
| --- | --- | --- | --- |
| H$_2$ | 65 | 87.42 | 13.0 |
| N$_2$ | 21 | 8.35 | 50.3 |
| A | 4 | 0.78 | 11.5 |
| CH$_4$ | 8 | 0.58 | 25.2 |
| NH$_3$ | 2 | (av) 2.86 | Nil |

By means of the invention, substantially all of the ammonia in the purge gas can be recovered with no water content. Moreover, provided that not more than 2% ammonia is contained in the purge gas, no machinery is required. Where more than 2% ammonia is present, however, it is desirable to include a refrigerator so as to reduce the concentration in the purge gas below 2% by partial condensation before passing it to the adsorber.

The entire apparatus can be skid-mounted, and suitably is arranged on two skids, one containing the adsorbers, the heater for the regenerating gas and (where used) the cooler for the regenerating gas, and the second containing the cryogenic separator including the heat exchanger, vapour/liquid separator and expansion valve.

Since fuel gas is not used for regeneration of the adsorbers, and therefore does not suffer the significant pressure drop required for this duty, it can be recovered at a higher pressure than hitherto.

Where means are provided for condensing part of the ammonia out of the purge gas prior to passing it to the adsorber, the condensate may be employed to provide refrigeration for the cryogenic unit.

Since it is not used for regeneration, the condensate recovered from the cryogenic unit will contain no ammonia and its use as a fuel gas therefore provides no environmental problems.

I claim:

1. A method for treating a purge gas from an ammonia synthesis recycle stream to recover from said purge gas ammonia and hydrogen values for recycle to the ammonia synthesis reaction, the method comprising providing the purge gas at superatmospheric pressure, removing ammonia from the compressed purge gas by adsorption in an ammonia adsorber, cooling substantially ammonia-free compressed purge gas recovered from the adsorption step to sub-ambient temperature to partially condense it and recovering therefrom a hydrogen rich gas stream and a condensate stream both at superatmospheric pressure, providing refrigeration for the partial condensation by expanding the condensate and thereafter evaporating it in indirect heat exchange relationship with the purge gas to be cooled, and regenerating the ammonia adsorber by passing therethrough at elevated temperature a regenerating gas at superatmospheric pressure, which gas is provided from the hydrogen rich gas stream.

2. A method as claimed in claim 1 in which after recovery from said adsorber, regenerating gas is combined with the remainder of the hydrogen rich gas stream for return to the ammonia synthesis reactor.

3. A method as claimed in claim 1 in which after the ammonia adsorber has been regenerated it is cooled ready for re-use in adsorption mode by passing through it a cooling gas provided from the hydrogen-rich gas stream.

4. A method as claimed in claim 3 in which the ammonia adsorber includes at least three adsorption zones arranged so that while at least one is in adsorption mode, at least a second is being regenerated and at least a third is being cooled subsequent to regeneration, and regeneration gas for said second zone is provided by heating cooling gas recovered from said third zone.

5. A method as claimed in claim 1 in which the cooling of the substantially ammonia-free compressed purge gas to partially condense it is assisted by passing said gas in indirect heat exchange with a refrigerant.

6. A method as claimed in claim 5 in which the refrigerant comprises liquid ammonia provided by expanding ammonia formed in the ammonia synthesis.

7. A method as claimed in claim 5 in which the refrigerant comprises liquid ammonia obtained by cooling the compressed purge gas to condense a part of its ammonia content prior to removing ammonia therefrom by adsorption in said ammonia adsorber, and expanding condensed ammonia thereby obtained.

8. A method as claimed in claim 7 in which said purge gas contains more than 2 mole % ammonia and the compressed purge gas is cooled to reduce the ammonia content to not greater than 2% by condensation prior to removing ammonia by adsorption in said ammonia adsorber.

9. A method as claimed in claim 1 in which the regenerating gas is provided by heating a portion of the hydrogen-rich gas stream, the heat being provided by combustion of a fuel gas provided from the evaporated condensate.

10. A method as claimed in claim 9 in which the regenerating gas is heated with superheated steam and heat for producing the superheated stream is provided by combustion of a fuel gas provided from the evaporated condensate.

11. Apparatus for recovering ammonia and hydrogen values from a purge gas from an ammonia synthesis recycle stream, the apparatus comprising an ammonia adsorber unit having an inlet for purge gas to be treated and an outlet for treated purge gas and including at least three adsorption zones and said unit being constructed and arranged for cyclic operation such that in successive periods each zone is (a) connected between said inlet and said outlet and is in adsorption mode, (b) thereafter undergoes regeneration and then (c) is cooled ready for re-use in adsorption mode, and in each period at least one zone is connected between said inlet and outlet and is in adsorption mode, at least a second is undergoing regeneration and at least a third is undergoing cooling ready for re-use in adsorption mode; means for passing cooling gas through said at least third zone to cool it; means for providing heated regeneration gas to said at least second zone; and means for recovering regeneration gas from said at least second zone;

a cryogenic separation unit including a heat exchanger, an expansion valve and a vapour-liquid separator, said heat exchanger having a first passageway having an inlet adapted to be connected for flow of fluid thereto from the outlet for the treated purge gas from said adsorption unit and an outlet connected for flow of fluid therefrom to the inlet of said separator, a second passageway having an inlet connected for flow of fluid thereto from the vapour outlet of said separator and an outlet, and a third passageway having an inlet for flow of fluid thereto from the low pressure outlet of said expansion valve the inlet of which is connected for flow of fluid thereto from the liquid outlet of the separator, and an outlet;

and in which the outlet of said second heat exchanger passageway is connected (a) to said means for providing heated regeneration gas whereby a first portion of the vapour recovered from said vapour/liquid separator is passed to said second zone as regeneration gas and (b) to a product gas pipeline.

12. Apparatus as claimed in claim 11 in which the means for providing heated regeneration gas to said at least second zone comprises means for heating cooling gas recovered from said at least third zone and providing the heated gas as regeneration gas to said at least second zone, and the outlet of said second heat exchanger passageway is connected for fluid flow to the inlet to said at least third zone whereby said first portion of vapour recovered from said vapour/liquid separator is passed first to said third zone as said cooling gas and thence to said second zone as said regeneration gas.

13. Apparatus as claimed in claim 11, which includes a second conduit for passing gas recovered from said at least second zone to said product gas pipeline.

14. Apparatus as claimed in claim 11 further including a fourth passageway in said heat exchanger and means for supplying a refrigerant thereto in indirect heat exchange relationship with said purge gas in said first passageway to assist the cooling of said purge gas.

15. Apparatus as claimed in claim 14 and further including means for condensing a part of the ammonia content of the purge gas prior to passing the purge gas to said adsorber unit, and means for expanding liquid ammonia thereby obtained and providing it as said refrigerant to said fourth passageway.

* * * * *